E. F. Pryor,
Ice Crusher,
N° 65,504.      Patented June 4, 1867.
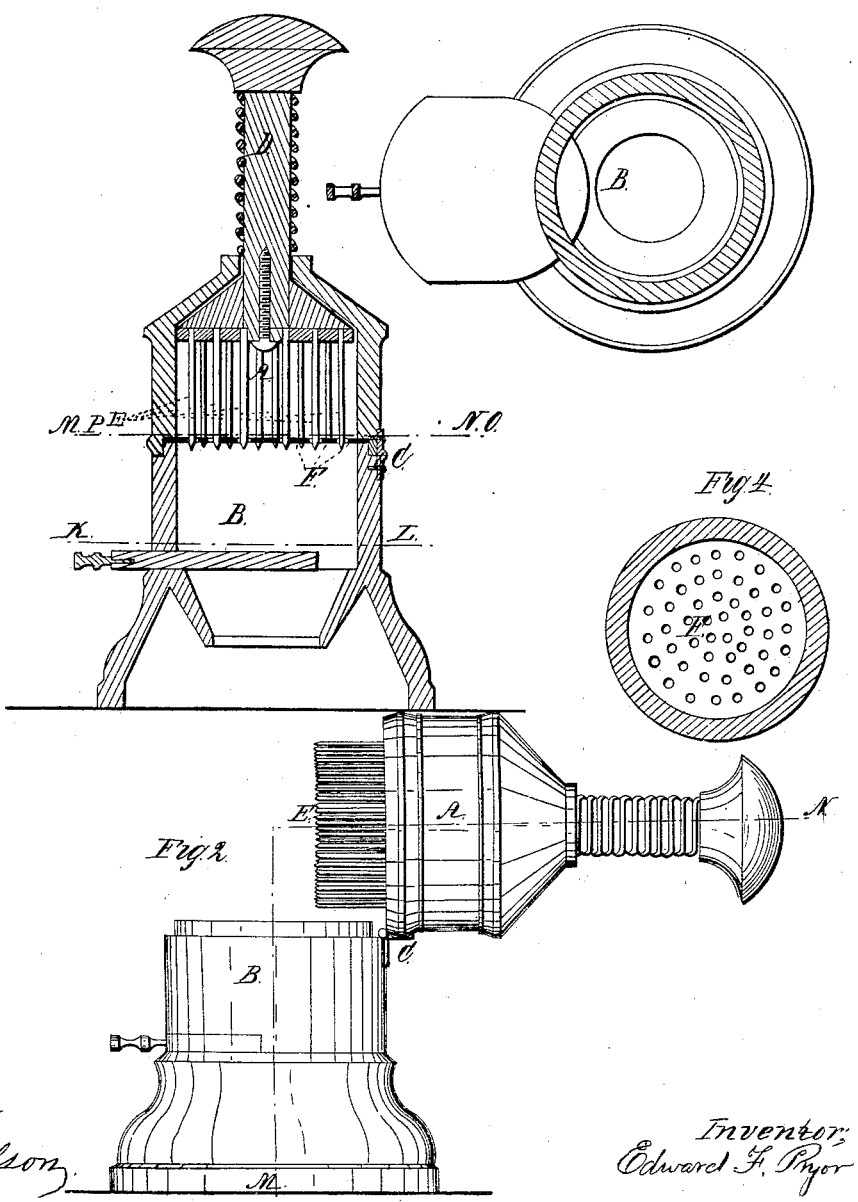
Witnesses:
J. C. Colby
Chas. F. Wilson
Inventor:
Edward F. Pryor

United States Patent Office.

EDWARD F. PRYOR, OF DAYTON, OHIO.

Letters Patent No. 65,504, dated June 4, 1867.

---

IMPROVED ICE-CRUSHER.

---

*The Schedule referred to in these Letters Patent and making part of the same.*

---

TO ALL WHOM IT MAY CONCERN:

Be it known that I, EDWARD F. PRYOR, of Dayton, State of Ohio, have invented new and useful improvements in Ice-Crushers; and I do hereby declare the following to be a full and exact description of the same, reference being had to the drawings that accompany and form a part of these specifications, in which—

Figure 1 is a vertical bisection, showing the general structure and arrangement of parts.

Figure 2, side elevation, with the upper chamber turned back on its hinges.

Figure 3, plan view of the lower chamber B, with false bottom or slide partially withdrawn, cut in line K L.

Figure 4, sectional view, cut on the line M P N O.

Letter A represents an upper chamber hinged to the lower one at C; B, the lower or ice-chamber; C, hinge connecting A and B; D, the plunger; E, picks extending downwards from the plunger D to penetrate and separate the ice; F, disk, perforated for the blades or picks, and serves to remove the ice from between the picks E when the plunger is raised.

The object of my invention is to provide an ice-crusher that shall have greater facilities for putting in the ice, and an arrangement for piercing the block of ice with a numerous set of sharp awl-shaped blades instead of crushing by great force, and in so constructing it that the ice-chamber shall be closed from the free action of the air, and against dust and the like, as also to have the facility of taking any portion of the crumbled ice desired, leaving the remainder for further use.

To secure the above desirable features in an effectual and economical manner, I construct my chamber in two parts, A and B, fitting closely to each other, as the drawings illustrate. In the upper one of them I place a plunger, with a numerous set of metallic blades, the upper ends of which are firmly inserted in the plunger D. These blades are made long in order to pierce the ice and divide it into small pieces with much less force than required with the ordinary heavy toothed masher. To prevent the ice from pressing between the teeth or blades E, and being drawn up by them when the plunger returns to its normal position, I use the perforated diaphragm, F, which cleans the teeth and leaves the ice all below, well divided into small pieces. By partially withdrawing the slide $g$ a portion of the ice may be withdrawn, and afterwards the remainder, or by closing the slide, as the air has no ready access, the remaining ice will keep sometime without melting. The diaphragm F supports and stays the long and smaller teeth E, otherwise they would be bent and sprung in various ways.

This device will serve a good purpose in household affairs for breaking or crushing crackers, sugar, and the like, and in saloons and dining-rooms for breaking crackers for soup, oysters, and the like.

The material suitable for these machines is light castings galvanized with zinc, or the chambers may be of wood, with the pores thoroughly filled with some substance to prevent it from absorbing water. As to form, they may be round (cylindrical) or square, to suit the taste of the public. I make several different sizes, light ones for household purposes, and heavier ones for saloons and dining-rooms. The number of picks or teeth, and consequently the distance from point to point thereof, is varied according as one desires a machine for crumbling ice into very fine pieces, or one that will leave it in coarser lumps.

I do not claim breaking ice by a toothed plunger or stamp, nor the use of the slide $g$ independently, or the funnel at the base for directing the mashed ice to the vessel that is to receive it. What I do claim as my invention, and desire to secure by Letters Patent, is—

1. The ice-chamber B, when provided with the chambered cover or extension A for containing the toothed plunger D, and perforated diaphragm F, either with or without the hinge C, constructed substantially as described and set forth.

2. The perforated diaphragm F, or its equivalent, when arranged for use in an ice-crusher, substantially as and for the purposes specified.

EDWARD F. PRYOR.

Witnesses:
D. C. COLBY,
CHAS. F. WILSON.